US008238051B2

(12) United States Patent
Baumgart et al.

(10) Patent No.: US 8,238,051 B2
(45) Date of Patent: Aug. 7, 2012

(54) REAL TIME MONITORING INCONSISTENT OPERATIONS IN A HARD DISK DRIVE

(75) Inventors: Peter M. Baumgart, San Jose, CA (US); Robert E. Eaton, San Jose, CA (US); Bernhard E. Knigge, San Jose, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 121 days.

(21) Appl. No.: 12/633,518

(22) Filed: Dec. 8, 2009

(65) Prior Publication Data
US 2011/0134557 A1 Jun. 9, 2011

(51) Int. Cl.
    G11B 5/09 (2006.01)
(52) U.S. Cl. .................................. 360/51; 360/31
(58) Field of Classification Search .................. None
    See application file for complete search history.

(56) References Cited

U.S. PATENT DOCUMENTS

| | | | |
|---|---|---|---|
| 4,809,248 A | 2/1989 | Sengoku | |
| 4,882,720 A | 11/1989 | Sengoku | |
| 5,539,592 A | 7/1996 | Banks et al. | |
| 5,589,996 A | 12/1996 | Patrick et al. | |
| 6,101,062 A | 8/2000 | Jen et al. | |
| 6,226,140 B1 * | 5/2001 | Serrano et al. | 360/60 |
| 6,388,832 B1 | 5/2002 | Dobbek et al. | |
| 6,882,487 B2 * | 4/2005 | Hanson et al. | 360/51 |
| 6,972,540 B1 * | 12/2005 | Wang et al. | 318/400.34 |
| 6,977,477 B2 | 12/2005 | Bloyer et al. | |
| 7,095,578 B2 | 8/2006 | Ma | |
| 7,362,534 B1 | 4/2008 | Schreck et al. | |
| 7,477,469 B2 * | 1/2009 | Cook et al. | 360/75 |
| 7,929,237 B2 * | 4/2011 | Grundvig et al. | 360/51 |
| 2004/0156137 A1 * | 8/2004 | Settje et al. | 360/51 |
| 2007/0236821 A1 | 10/2007 | Ma et al. | |
| 2007/0268605 A1 | 11/2007 | Ryu | |
| 2010/0284109 A1 * | 11/2010 | Kim et al. | 360/77.05 |

FOREIGN PATENT DOCUMENTS

| JP | 54061913 | 5/1979 |
|---|---|---|
| JP | 4330608 | 11/1992 |

OTHER PUBLICATIONS

Machines Corporation, International Business "Spindle Motor Current Logging for Hard Disk Interface Precaution", *Research Disclosure Database No. 433133*, (May 2000),1-2.

* cited by examiner

*Primary Examiner* — Jason Olson

(57) ABSTRACT

Real time monitoring inconsistent operations in a hard disk drive, wherein the hard disk drive comprises a magnetic disk, a controller and a channel clock. A timing signal from the channel clock is measured in real time in the controller. Time intervals between sector identifier marks of the magnetic disk are detected using the timing signal from the channel clock during reading and writing operations of the hard disk drive in the controller. An inconsistency in the drive operations is detected in the controller based on changes in the time intervals between the sector identifier marks is detected during operation of the hard disk drive. The detection of the inconsistency in the drive operations is responded to.

20 Claims, 3 Drawing Sheets

REAL TIME MONITORING INCONSISTENT OPERATIONS IN A HARD DISK DRIVE

BACKGROUND ART

At least one hard disk drive (HDD) is used in almost all computer system operations. In fact, most computing systems are not operational without some type of HDD to store the most basic computing information such as the boot operation, the operating system, the applications, and the like. In general, the HDD is a device which may or may not be removable, but without which the computing system will generally not operate.

The HDD may be susceptible to inconsistent drive operations such as the slider head contacting the magnetic disk of the HDD, shock, interference, physical movement, free fall, changes in altitude and etc. Such inconsistent drive operations may cause poor performance, failures in reading and writing data, or may damage the components of the HDD.

DESCRIPTION OF EMBODIMENTS

Figure 1:
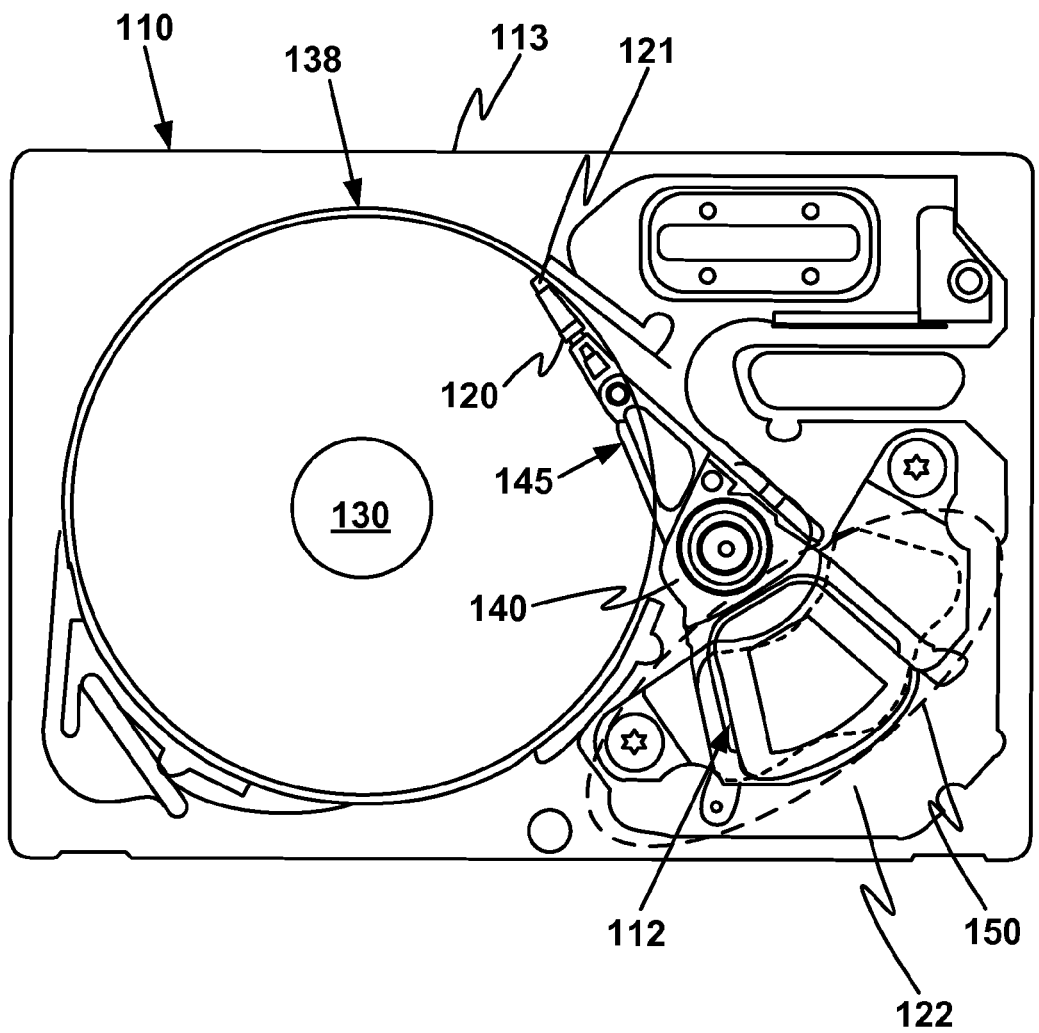
FIG. 1 is a block diagram of an HDD in accordance with embodiments of the present invention.

Reference will now be made in detail to various embodiments of the present invention. While the invention will be described in conjunction with these embodiments, it should be understood that the described embodiments are not intended to limit the invention to these embodiments. On the contrary, the invention is intended to cover alternatives, modifications and equivalents, which may be included within the spirit and scope of the invention as described in the various embodiments and as defined by the appended claims.

Furthermore, in the following description of embodiments, numerous specific details are set forth in order to provide a thorough understanding of various embodiments of the present invention. However, it will be recognized by one of ordinary skill in the art that embodiments of the present invention may be practiced without these specific details. In other instances, well known methods, procedures, components, and circuits have not been described in detail as not to unnecessarily obscure aspects of embodiments of the present invention.

Overview of Discussion

The discussion will begin with a brief overview of the present invention. The discussion will then focus on a HDD and components connected therewith. The discussion will then focus on embodiments of real time monitoring of inconsistent operations in a hard disk drive.

In the routine use of a HDD, operations that are inconsistent with optimal operation of the HDD may be experienced. Such inconsistency may included, but are not limited to, the slider head contacting a disk of the HDD, shock, interference, physical movement, free fall, changes in altitude relative to sea level, debris or lube pick up on the slider head, a change in pole tip protrusion, a change in the fly height of the slider head above a disk of the HDD, a change in the rotational velocity of the motor driving the disk of the HDD, a change in the current applied to the motor used to drive the disk, and a change in the rotational velocity of the disk. It is desirable to monitor these inconsistencies and respond to them accordingly.

Embodiments of the present technology monitor the above described inconsistencies using timing signals. In one embodiment, the disk of the HDD is divided into a finite number of servo fields. Each servo fields has a sector identifier mark (SID). Each sector identifier mark is read each revolution of the disk during operation. In one embodiment, there are regular intervals of time during a reading of the sector identifier marks. These time intervals may be monitored to monitor, detect and respond to the described inconsistencies. For example, a HDD may comprise a channel clock that generates a highly accurate time signal. The time signal from the channel clock may be used to measure the time intervals between reading sector identifier marks. The motocurrent signal may also be monitored to compare with the readings from the sector identifier marks. In one embodiment, if one time interval is longer or shorter than what is expected, an inconsistent drive operation is detected.

Embodiments of the present technology may respond to such an inconsistency in any number of ways. Such responses may include, but are not limited to, adjusting the rotational velocity of the disk, adjusting the current applied to the motor driving the disk, notifying a user of the hard disk drive of the inconsistency, warning a user of the hard disk drive to back up the data stored on the hard disk drive, unloading the slider head of the hard disk drive to a ramp, adjusting the space between the disk and the slider head of the hard disk drive, and adjusting the pole tip protrusion of the slider head. Embodiments of the present technology are operable to monitor inconsistencies in real time including during both reading and writing operation of the HDD.

Embodiments of the present technology are also able to distinguish the slider head contacting a disk of the HDD or debris or lube pick up on the slider head from a free fall or external shock. In one embodiment, this is accomplished using readings from sector identifier marks and from external shock monitors that are typically placed within a HDD.

Operation

The basic HDD model includes a magnetic storage disk or hard disk that spins at a designed rotational speed. An actuator arm with a suspended slider is utilized to reach out over the disk. The slider may comprise one or more magnetic read and write transducers or heads for reading and writing information to or from a location on the disk. The slider may also comprise a heater coil designed to change shape when heat is transferred to the heater coil by means of electric current. The slider is mounted on a suspension which connects to the actuator arm. In the case of multiple platter drives, there can be multiple suspensions attaching to multiple actuator arms as components of a head stack assembly. The head stack assembly also includes a voice coil which is part of a motor used for moving the arms to a desired location on the disk(s).

With reference now to FIG. 1, a schematic drawing of one embodiment of an information storage system including a magnetic hard disk file or HDD 110 for a computer system is shown, although only one head and one disk surface combination are shown. What is described herein for one head-disk combination is also applicable to multiple head-disk combinations. In other words, embodiments of the present technology are independent of the number of head-disk combinations.

In general, HDD 110 has an outer housing 113 usually including a base portion (shown) and a top or cover (not shown). In one embodiment, housing 113 contains a disk pack having at least one media or magnetic disk 138. The disk pack (as represented by disk 138) defines an axis of rotation and a radial direction relative to the axis in which the disk pack is rotatable.

A spindle motor assembly having a central drive hub 130 operates as the axis and rotates the disk 138 or disks of the disk pack in the radial direction relative to housing 113. An actuator assembly 140 includes one or more actuator arms 145. When a number of actuator arms 145 are present, they are usually represented in the form of a comb that is movably or pivotally mounted to base/housing 113. An actuator arm controller 150 is also mounted to base 113 for selectively moving the actuator arms 145 relative to the disk 138. Actuator assembly 140 may be coupled with a connector assembly, such as a flex cable to convey data between arm electronics and a host system, such as a computer, wherein HDD 110 resides.

In one embodiment, each actuator arm 145 has extending from it at least one cantilevered integrated lead suspension (ILS) 120. The ILS 120 may be any form of lead suspension that can be used in a data access storage device. The level of integration containing the slider 121, ILS 120, and read and write head is called the head stack assembly.

The ILS 120 has a spring-like quality, which biases or presses the air-bearing surface of slider 121 against disk 138 to cause slider 121 to fly at a precise distance from disk 138. Slider 121 may have a pole tip which protrudes at various lengths from slider 121. Slider 121 may also contain a read head, a write head and a heater coil. ILS 120 has a hinge area that provides for the spring-like quality, and a flexing cable-type interconnect that supports read and write traces and electrical connections through the hinge area. A voice coil 112, free to move within a conventional voice coil motor magnet assembly is also mounted to actuator arms 145 opposite the head stack assemblies. Movement of the actuator assembly 140 causes the head stack assembly to move along radial arcs across tracks on the surface of disk 138. Memory device 122 is capable of storing electronic data that can be used in the operation of HDD 110. Actuator arm controller 150, and other components of HDD 110, has the ability to access memory device 122 to receive information, data, instruction or commands related to its operation.

Figure 2:
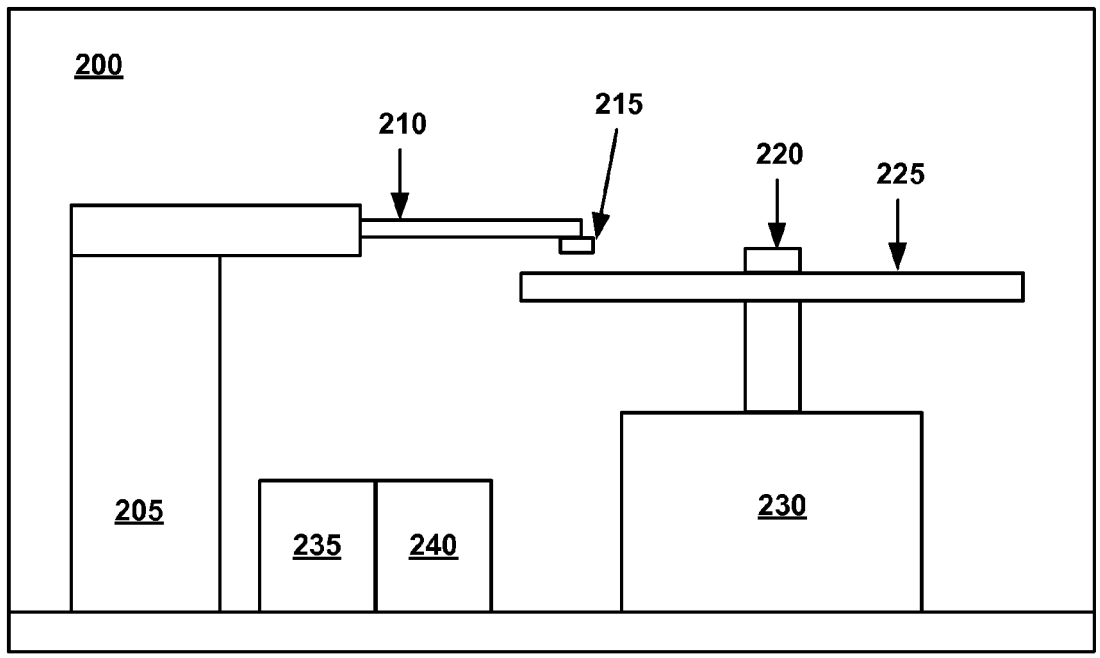
FIG. 2 is a block diagram of an HDD in accordance with embodiments of the present invention.

Reference will now be made to FIG. 2, a block diagram of a cross sectional view of one embodiment of a HDD is shown, although only one head and one disk surface combination are shown. FIG. 2 represents a HDD that may comprise some or all of the features and components of the HDD of FIG. 1. FIG. 2 depicts, HDD 200, voice coil 205, actuator arm 210, slider 215, spindle 220, disk 225, spindle motor 230, channel clock 235 and controller 240. FIG. 2 comprises components and portions of the present technology that may or may not be used with different embodiments of the present technology and should not be construed to limit the present technology.

In one embodiment, HDD 200 is the same HDD as HDD 110 of FIG. 1. In one embodiment, voice coil 205 the same as voice coil 112 of FIG. 1. In one embodiment, actuator arm 210 is one of the actuator arms represented by actuator arms 145 of FIG. 1. In one embodiment, slider 215 is the same as slider 121 of FIG. 1. In one embodiment, spindle 220 and spindle motor 230 are the same as central drive hub 130 of FIG. 1. In one embodiment, disk 225 is the same as disk 138 of FIG. 1. In one embodiment, the present technology has features and capabilities as those described in those described in U.S. Pat. No. 7,508,618 which is herein incorporated by reference insofar as the terminology therein is consistent with this disclosure. The above mentioned patent discusses how to detect contact using multiple contact detectors simultaneously during a fly height calibration of slider to disk clearance which typically occurs in manufacturing. These ideas are extended in the present technology to monitor head to disk contact in real time by constantly reading the SID to SID time using a very accurate clock. In one embodiment the channel clock is used. In one embodiment the channel clock and also the spindle motorcurrent are used simultaneously. The spindle motorcurrent adjusts the RPM but in a rather coarse fashion and can use a 'linear predictor.' The channel clock is measuring the deviation from the predictor which then could indicate contact. Since the SID time is being read at all times—i.e. during read and write operation and could be used to measure pole tip protrusion. Pole tip protrusion (PTR) occurs during a write operation due to heating of the write pole. The heating of the write pole will add to the heat generated by the TFC coil and lead to a larger 'bulge' and hence to an 'earlier' contact onset. With very high write powers, the write pole will protrude more and the contact point may also shift leading to different contact dynamics and possibly increased friction (due to a larger bulge size). This in turn leads to larger RPM slowdown and to a longer SID to SID time and hence to a better contact signature.

In one embodiment, channel clock 235 is very accurate and has a time resolution able to detect differences in variations of the time intervals between reads of the sector identifier marks. In one embodiment, channel clock 235 is a component of HDD 200. In one embodiment, channel clock 235 may be utilized to monitor sector to sector variations in timing. In one embodiment, time intervals between readings of sector identifier marks are measured in microseconds and channel clock 235 measures time in picoseconds. In one embodiment, variations in sector timing or variations of timing between time intervals that take place between reading sector identifier marks indicate an inconsistent drive operation. In one embodiment, reading of sector identifier marks is accomplished in real time during the operation of HDD 200 including during both reading and writing operations of HDD 200. In one embodiment, a clock faster than channel clock 235 is used to measure time. In one embodiment, the channel clock may be adjusted to optimize bit spacing and hence areal density.

In one embodiment, a calibration is performed using SID to SID time and integrated motorcurrent. The calibration creates a linear predictor that may be used to detect inconsistencies. In one embodiment, the calibration is performed only once during the manufacturing process and is saved on the HDD.

In one embodiment, a variation in sector timing indicates a change in the rotational velocity of the disk. In one embodiment, a variation in sector timing indicates contact between disk 225 and slider 215. In one embodiment, a variation in sector timing indicates physical movement of HDD 200. For example, HDD 200 may be in a state of free fall due to gravity or may be experiencing other abrupt physical movement. In one embodiment, a variation in sector timing indicates an electric shock to HDD 200 or its components. In one embodiment, a variation in sector timing indicates a variation in pole tip protrusion of slider 215. In one embodiment, a variation in sector timing indicates that slider 215 has acquired or picked up a foreign body. Such a foreign body could be lube or debris in HDD 200.

Embodiments of the present technology are able to distinguish the slider head contacting a disk of the HDD or debris or lube pick up on the slider head from a free fall or external shock. In one embodiment, this is accomplished using readings from sector identifier marks and from external shock monitors that are typically placed within a HDD. In one embodiment, the external shock monitors are calibrated to detect a free fall but are not always accurate. In one embodiment, a detection of a physical movement of the HDD, such as a free fall, by the external shock monitors is compared to data from the SID readings and/or the motorcurrent signal. By comparing the data a determination may be made as to whether the HDD is experiencing a head to disk contact, debris or lube pick up on the head, free fall, or external shock. Appropriate action may then be taken.

In one embodiment, the HDD includes a servo variable gain amplifier (SVGA). In one embodiment, a signal from the servo variable gain amplifier is measured and compared to data from the SID readings and/or the motorcurrent signal. In so doing, a determination may be made that the detected inconsistency is the slider head contacting or bouncing on a surface of a disk of the HDD.

Slider 215, in one embodiment, comprises a heater coil located between a read head and a write head. In one embodiment, slider 215 comprises pole tips that protrude from slider 215 in varying lengths. In one embodiment, the length of the protrusion varies based on how hot the pole tip is. A pole tip that has higher heat levels will expand and grow closer to disk 225. By adjusting the current applied to the heater coil, the heat level of the pole tip may be controlled. For example, if an electric current is applied to heater coil, the region around the heater thermally expands leading to reduced head-disk spacing. This is often referred to as Thermal Fly-height Control (TFC). To accurately control the head to disk clearance, one needs to calibrate the necessary power required for each head to fly at a certain spacing. Embodiments of the present technology may be used to monitor pole tip protrusion by detecting the inconsistencies between the motorcurrent signal and the time intervals between SID readings as described above.

In one embodiment, controller 240 is a hardware module and is a component of HDD 200. In one embodiment, controller 240 is made up of existing hardware components of HDD 200. In one embodiment, controller 240 comprises firmware designed to assist in carrying out its operations. In one embodiment, controller 240 is capable of measuring a timing signal from the channel clock in real time, detecting time intervals between sector identifier marks of the magnetic disk, detecting an inconsistency in the drive operations based on changes in the time intervals between the sector identifier marks during operation of the hard disk drive, and responding to the inconsistency.

Figure 3:
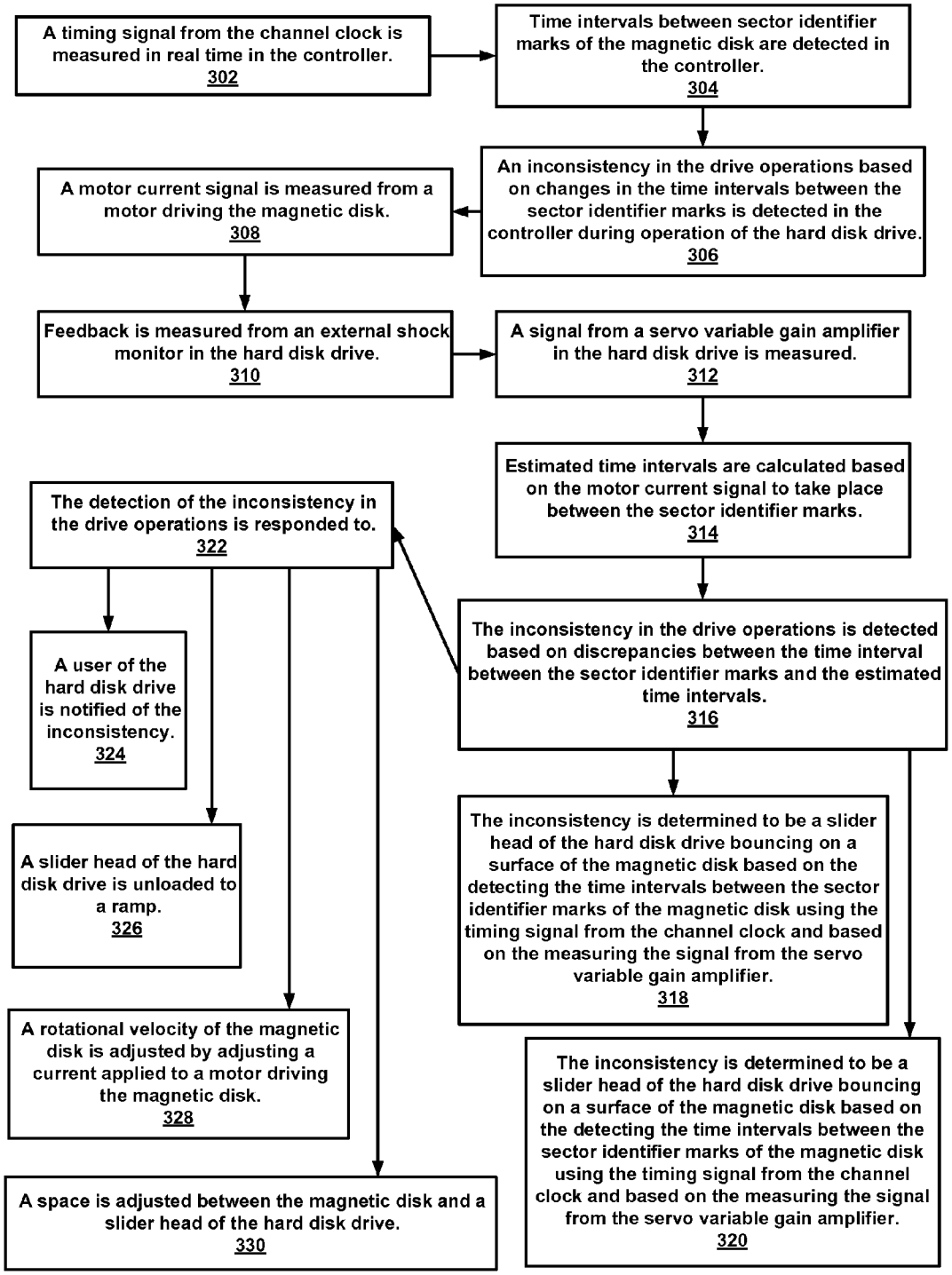
FIG. 3 is a flowchart of a method for real time monitoring inconsistent operations in a hard disk drive in accordance with embodiments of the present invention.

FIG. 3 is a flowchart of method 300 for real time monitoring inconsistent operations in a hard disk drive, wherein the hard disk drive comprises a magnetic disk and a channel clock, in accordance with embodiments of the present invention.

At 302, a timing signal from the channel clock is measured in real time in the controller. In one embodiment, the channel clock is channel clock 235 of FIG. 2 and is accurate down to picoseconds. The timing signal is monitored in real time during normal operations of the HDD, including both reading and writing operations of the HDD. In one embodiment, the channel clock is an existing component of HDD 200 of FIG. 2.

At 304, time intervals between sector identifier marks of the magnetic disk are detected in the controller. In one embodiment, the time intervals are measured using the channel clock. In one embodiment, the sector identifier marks comprise a finite number and correspond to the servo fields of the magnetic disk.

At 306, an inconsistency in the drive operations is detected in the controller based on changes in the time intervals between the sector identifier marks is detected during operation of the hard disk drive. In one embodiment, the inconsistency is selected from the group of inconsistencies consisting of; the magnetic disk contacting a slider head of the hard disk drive, a physical movement of the hard disk drive, a shock to the hard disk drive, a change in altitude of the hard disk drive relative to sea level, a change in a protrusion of a pole tip of a slider head of the hard disk drive, and a change in rotational velocity of the magnetic disk.

At 308, in one embodiment, a motor current signal is measured from a motor driving the magnetic disk in the controller. For example, spindle motor 230 controls the rotation of disk 225 of FIG. 2. In one embodiment, spindle motor 230 varies the speed in which it drives disk 225. The varying speed can be controlled by the current applied to spindle motor 230 to operate it. This signal current may be detected to determine what the rotational velocity of disk 225 should be. In one embodiment, measuring the motor current signal is accomplished during the manufacturing process. In such an embodiment, a linear predictor is created and saved and the calibration does not need to be performed more than once.

At 310, in one embodiment, feedback is measured from an external shock monitor in the hard disk drive.

At 312, in one embodiment, a signal from a servo variable gain amplifier in said hard disk drive is measured.

At 314, in one embodiment, estimated time intervals are calculated based on the motor current signal to take place between the sector identifier marks in the controller. In one embodiment, the motor current signal is the current being applied to spindle motor 230 of FIG. 2. In one embodiment, the estimated time intervals may be calculated based on what the rotational velocity of disk 225 should be based on the motor current signal.

At 316, in one embodiment, the inconsistency in the drive operations is detected in the controller based on discrepancies between the time interval between the sector identifier marks and the estimated time intervals. In one embodiment, an estimate of what the rotational velocity of disk 225 should be is calculated and used to estimate what the time intervals should be between the sector identifier mark readings. In such an embodiment, there may be a discrepancy on what the actual time intervals are and what they are estimated to be. This discrepancy based on the estimated time interval may indicate something is disturbing the operation of the HDD because the actual time intervals are not matching the estimated time intervals.

At 318, in one embodiment, the inconsistency is determined to be a slider head of the hard disk drive bouncing on a surface of the magnetic disk based on the detecting the time intervals between the sector identifier marks of the magnetic disk using the timing signal from the channel clock and based on the measuring the signal from the servo variable gain amplifier.

At 320, in one embodiment, the inconsistency is determined to be a physical movement of the hard disk drive, wherein the determining is based on the detecting the time intervals between the sector identifier marks of the magnetic disk using the timing signal from the channel clock and based on the measuring the feedback from the external shock monitor.

At 322, the detection of the inconsistency in the drive operations is responded to. In one embodiment, the response may vary. In one embodiment, controller 240 is able to determine what caused the inconsistency and take appropriate action. For example, controller 240 may be able to determine that the inconsistency was due to a free fall and will respond by unloading the slider head to ramp. In one embodiment, an appropriate response may be to do nothing.

At 324, in one embodiment, the response at 314 further comprises, a user of the hard disk drive is notified of the inconsistency. In one embodiment, such a notification may warn the user of eminent HDD failure. In one embodiment, such a notification may warn the user to back up the data stored on the HDD.

At 326, in one embodiment, the response at 314 further comprises, a slider head of the hard disk drive is unloaded to a ramp. In one embodiment, such a response may be appropriate where the inconsistency is caused by a drive free fall, interference or shock. In one embodiment, unloading the slider head of the hard disk drive comprises using actuator arm 210 to move slider 215 away from disk 225 of FIG. 2. By so doing, disk 225 and slider 215 are prevent from coming in contact with each other and causing damages or read and write errors.

At 328, in one embodiment, the response at 314 further comprises, a rotational velocity of the magnetic disk is adjusted by adjusting a current applied to a motor driving the magnetic disk. In one embodiment, such a response may be appropriate where the rotational velocity of the disk has been slowed down due to a foreign body on the slider head.

At 330, in one embodiment, the response at 314 further comprises, a space is adjusted between the magnetic disk and a slider head of the hard disk drive. In one embodiment, the space is adjusted by adjusting the pole tip protrusion of slider 215 of FIG. 2.

Thus, embodiments of the present invention provide real time monitoring of inconsistent operations in a hard disk drive. It should be appreciated that the above described methods are well suited to be instructions on a computer-usable storage medium that when executed cause a computer system to perform methods for real time monitoring inconsistent operations in a hard disk drive.

Example embodiments of the present technology are thus described. Although the subject matter has been described in a language specific to structural features and/or methodological acts, it is to be understood that the subject matter defined in the appended claims is not necessarily limited to the specific features or acts described above. Rather, the specific features and acts described above are disclosed as example forms of implementing the claims. Additionally, in various embodiments of the present technology, the steps and methods described herein do not need to be carried out in the order specified, nor do all steps need to be carried out to accomplish the purposes of the technology.

What is claimed:

1. A method for real time monitoring inconsistent operations in a hard disk drive, wherein said hard disk drive comprises a magnetic disk, a controller and a channel clock, the method comprising:
   measuring a timing signal from said channel clock in real time in said controller;
   measuring feedback from an external shock monitor in said hard disk drive;
   detecting time intervals between sector identifier marks of said magnetic disk in said controller using said timing signal from said channel clock during drive operations of said hard disk drive;
   detecting an inconsistency in said drive operations in said controller based on changes in said time intervals between said sector identifier marks during operation of said hard disk drive and based on said measuring said feedback from said external shock monitor; and
   responding to said detecting said inconsistency in said drive operations.

2. The method of claim 1, wherein said detecting said inconsistency in said drive operations further comprising:
   measuring a motor current signal from a motor driving said magnetic disk in said controller;
   calculating estimated time intervals based on said motor current signal to take place between said sector identifier marks in said controller; and
   detecting said inconsistency in said drive operations in said controller based on discrepancies between said time intervals between said sector identifier marks and said estimated time intervals.

3. The method of claim 1, wherein said responding to said detecting said inconsistency in said drive operations further comprises adjusting a rotational velocity of said magnetic disk by adjusting a current applied to a motor driving said magnetic disk.

4. The method of claim 1, wherein said responding to said detecting said inconsistency in said drive operations further comprises notifying a user of said hard disk drive of said inconsistency.

5. The method of claim 1, wherein said responding to said detecting said inconsistency in said drive operations further comprises unloading a slider head of said hard disk drive to a ramp.

6. The method of claim 1, wherein said responding to said detecting said inconsistency in said drive operations further comprises adjusting a space between said magnetic disk and a slider head of said hard disk drive.

7. The method of claim 1, further comprising:
   wherein said detecting said inconsistency in said drive operations further comprises, determining said inconsistency is a physical movement of said hard disk drive, wherein said determining is based on said detecting said time intervals between said sector identifier marks of said magnetic disk using said timing signal from said channel clock and based on said measuring said feedback from said external shock monitor.

8. The method of claim 1, wherein said inconsistency in said drive operations is a shock to said hard disk drive.

9. The method of claim 1, wherein said inconsistency in said drive operations is a change in altitude of said hard disk drive relative to sea level.

10. The method of claim 1, wherein said inconsistency in said drive operations is a change in a protrusion of a pole tip of a slider head of said hard disk drive.

11. The method of claim 1, further comprising:
    measuring a signal from a servo variable gain amplifier in said hard disk drive; and
    wherein said detecting said inconsistency in said drive operations further comprises, determining said inconsistency is a slider head of said hard disk drive bouncing on a surface of said magnetic disk based on said detecting said time intervals between said sector identifier marks of said magnetic disk using said timing signal from said channel clock and based on said measuring said signal from said servo variable gain amplifier.

12. A non-transitory computer-usable storage medium having instructions embodied therein that when executed cause a computer system to perform a method for real time monitoring inconsistent operations in a hard disk drive, wherein said hard disk drive comprises a magnetic disk, a controller and a channel clock, said method comprising:
    measuring a timing signal from said channel clock in said controller;
    measuring a motor current signal from a motor driving said magnetic disk;

detecting time intervals between sector identifier marks of said magnetic disk in said controller using said timing signal from said channel clock during drive operations of said hard disk drive;

detecting an inconsistency in said drive operations in said controller based on inconsistencies between said timing intervals between said sector identifier marks and said motor current signal; and responding to said detecting said inconsistency in said drive operations.

13. The non-transitory computer-usable storage medium of claim 12, wherein said detecting said inconsistency in said drive operations further comprising:

calculating estimated time intervals based on said motor current signal to take place between said sector identifier marks; and said detecting said inconsistency in said drive operations based on discrepancies between said time intervals between said sector identifier marks and said estimated time intervals.

14. The non-transitory computer-usable storage medium of claim 12, wherein said responding to said detecting said inconsistency in said drive operations further comprises adjusting a rotational velocity of said magnetic disk by adjusting a current applied to a motor driving said magnetic disk.

15. The non-transitory computer-usable storage medium of claim 12, wherein said responding to said detecting said inconsistency in said drive operations further comprises unloading a slider head of said hard disk drive to a ramp.

16. The non-transitory computer-usable storage medium of claim 12, wherein said inconsistency in said drive operations is a physical movement of said hard disk drive.

17. The non-transitory computer-usable storage medium of claim 12, wherein said inconsistency in said drive operations is a shock to said hard disk drive.

18. The non-transitory computer-usable storage medium of claim 12, wherein said inconsistency in said drive operations is a change in a protrusion of a pole tip of a slider head of said hard disk drive.

19. A method for real time monitoring inconsistent operations in a hard disk drive, wherein said hard disk drive comprises a magnetic disk, a spindle motor, a controller, and a channel clock, the method comprising:

measuring a timing signal from said channel clock in said controller;

measuring a motor current signal from said spindle motor;

detecting time intervals between sector identifier marks of said magnetic disk in said controller using said timing signal from said channel clock during drive operations of said hard disk drive;

detecting an inconsistency in said drive operations in said controller based on inconsistencies between said timing intervals between said sector identifier marks and said motor current signal; and responding to said detecting said inconsistency in said drive operations.

20. The method of claim 19, wherein said detecting said inconsistency in said drive operations further comprising:

measuring a signal from an external shock monitor;

comparing said signal from said external shock monitor to said inconsistency detected in said controller;

determining said inconsistency detected in said controller is selected from the group of inconsistencies consisting of:

said magnetic disk contacting a slider head of said hard disk drive, a physical movement of said hard disk drive, a shock to said hard disk drive, a change in altitude of said hard disk drive relative to sea level, a change in a protrusion of a pole tip of a slider head of said hard disk drive, and a change in rotational velocity of said magnetic disk.

\* \* \* \* \*